US011487624B2

(12) United States Patent
Wang et al.

(10) Patent No.: US 11,487,624 B2
(45) Date of Patent: Nov. 1, 2022

(54) DISTRIBUTED COMPUTING SYSTEM WITH RESOURCE MANAGED DATABASE CLONING

(71) Applicant: ServiceNow, Inc., Santa Clara, CA (US)

(72) Inventors: Paul Wang, Bothell, WA (US); Xiaoyi Ye, Sammamish, WA (US); Xuejia Lu, Bellevue, WA (US); Sridhar Chandrashekar, Sammamish, WA (US)

(73) Assignee: ServiceNow, Inc., Santa Clara, CA (US)

( * ) Notice: Subject to any disclaimer, the term of this patent is extended or adjusted under 35 U.S.C. 154(b) by 526 days.

(21) Appl. No.: 16/569,290

(22) Filed: Sep. 12, 2019

(65) Prior Publication Data

US 2020/0081789 A1    Mar. 12, 2020

Related U.S. Application Data

(63) Continuation of application No. 15/284,298, filed on Oct. 3, 2016, now Pat. No. 10,437,856, which is a
(Continued)

(51) Int. Cl.
*G06F 16/00*    (2019.01)
*G06F 11/14*    (2006.01)
*G06F 16/27*    (2019.01)

(52) U.S. Cl.
CPC ...... *G06F 11/1448* (2013.01); *G06F 11/1461* (2013.01); *G06F 11/1464* (2013.01);
(Continued)

(58) Field of Classification Search
None
See application file for complete search history.

(56) References Cited

U.S. PATENT DOCUMENTS 5,684,984 A   11/1997  Jones et al.
6,321,229 B1  11/2001  Goldman
(Continued)

FOREIGN PATENT DOCUMENTS

EP      1041487 A2    10/2000
WO   2014/130035 A1    8/2014

OTHER PUBLICATIONS

Notice of Acceptance for Australian Patent Application No. 2020202574 dated Jan. 20, 2021; 3 pgs.
(Continued)

*Primary Examiner* — Thu Nguyet T Le
(74) *Attorney, Agent, or Firm* — Fletcher Yoder PC

(57) ABSTRACT

When multiple backup database instances most recently experienced an update is determined. If a most recently updated backup database instance was updated within a defined time period of one or more other backup database instances, a source instance for cloning is selected as the backup database instance that satisfies at least one of a physical or logical proximity criteria relative to a designated database instance. If a difference in update times is greater than the defined time period, e.g., for the two most recent backup database instances, the source instance for cloning is selected to be the most recently updated backup database instance. Cloning to a target instance is performed using the selected backup database instance as a source instance as long as preparatory operations all pass. If not, the source databases are used for the cloning while still being accessible to clients.

19 Claims, 6 Drawing Sheets

Related U.S. Application Data continuation of application No. 14/993,726, filed on Jan. 12, 2016, now Pat. No. 9,460,181.

(60) Provisional application No. 62/106,796, filed on Jan. 23, 2015.

(52) U.S. Cl.
CPC ......... *G06F 11/1469* (2013.01); *G06F 16/27* (2019.01); *G06F 16/275* (2019.01); *G06F 2201/80* (2013.01)

(56) References Cited

U.S. PATENT DOCUMENTS

| | | |
|---|---|---|
| 6,799,189 B2 | 9/2004 | Huxoll |
| 6,816,898 B1 | 11/2004 | Scarpelli |
| 6,892,221 B2 | 5/2005 | Ricart et al. |
| 6,895,586 B1 | 5/2005 | Brasher |
| 7,020,706 B2 | 3/2006 | Cates |
| 7,027,411 B1 | 4/2006 | Pulsipher |
| 7,356,734 B2 | 4/2008 | Ricart et al. |
| 7,389,314 B2 | 6/2008 | Kulkarni et al. |
| 7,392,300 B2 | 6/2008 | Anantharangachar |
| 7,395,258 B2 | 7/2008 | Altinel et al. |
| 7,549,037 B1 | 6/2009 | Kale et al. |
| 7,555,620 B1 | 6/2009 | Manley |
| 7,555,674 B1 | 6/2009 | Wang |
| 7,617,073 B2 | 11/2009 | Trinon |
| 7,680,795 B2 | 3/2010 | Lashley et al. |
| 7,685,167 B2 | 3/2010 | Mueller |
| 7,716,353 B2 | 5/2010 | Golovinsky |
| 7,769,718 B2 | 8/2010 | Murley |
| 7,890,508 B2 | 2/2011 | Gerber et al. |
| 7,925,981 B2 | 4/2011 | Pourheidari |
| 7,933,927 B2 | 4/2011 | Dee |
| 7,945,860 B2 | 5/2011 | Vambenepe |
| 8,082,222 B2 | 12/2011 | Rangarajan |
| 8,132,260 B1 | 3/2012 | Mayer et al. |
| 8,234,469 B2 | 7/2012 | Ranade |
| 8,380,645 B2 | 2/2013 | Kowalski |
| 8,402,127 B2 | 3/2013 | Solin |
| 8,407,518 B2 | 3/2013 | Nelson et al. |
| 8,554,750 B2 | 10/2013 | Rangaranjan |
| 8,583,600 B2 | 11/2013 | Hazlewood et al. |
| 8,600,931 B1 | 12/2013 | Ravan |
| 8,612,408 B2 | 12/2013 | Trinon |
| 8,646,093 B2 | 2/2014 | Myers |
| 8,666,938 B1 | 3/2014 | Pancholy |
| 8,745,040 B2 | 6/2014 | Kowalski |
| 8,812,539 B2 | 8/2014 | Milousheff |
| 8,818,994 B2 | 8/2014 | Kowalski |
| 8,832,028 B2 | 9/2014 | Susairaj et al. |
| 8,832,652 B2 | 9/2014 | Mueller |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 2004/0205391 A1 | 10/2004 | Thompson |
| 2006/0080362 A1 | 4/2006 | Wagner et al. |
| 2008/0028006 A1* | 1/2008 | Liu ................. G06F 16/273 |
| 2010/0257142 A1 | 10/2010 | Murphy et al. |
| 2011/0093436 A1* | 4/2011 | Zha ................. G06F 16/178 |
| | | 711/E12.001 |
| 2013/0233627 A1 | 9/2013 | Vidal |
| 2014/0019414 A1 | 1/2014 | Abraham et al. |
| 2014/0082167 A1 | 3/2014 | Robinson et al. |
| 2014/0095452 A1 | 4/2014 | Lee et al. |
| 2014/0114921 A1 | 4/2014 | Klimetschek et al. |
| 2014/0143207 A1 | 5/2014 | Brewer et al. |
| 2014/0237545 A1 | 8/2014 | Mylavarapu et al. |

OTHER PUBLICATIONS

Austrlian Office Action for Australian Patent Application No. 2020202574 dated Dec. 9, 2020; 4 pgs.
VEEAM Modem Data Protection, Modem Data Protection, Built for Virtualization, Product Bulletin, #1 VM Backup, downloaded Jan. 6, 2016, from http://veeampdf.s3.amazonaws.com/datasheet/veeam_backup_7 editions_comparison_en.pdf, 3 pp.
Cloning an Oracle Database Using Recovery Manager {RMAN} Backup, downloaded Jan. 6, 2016, from http://docs.oracle.com/cd/E24628_01/em.121/e27046/cloning_database.htm#EMLCM93233, 3 pp.
European office action for European Patent Application No. 16701896.9 dated May 14, 2020; 5 pgs.

* cited by examiner

DISTRIBUTED COMPUTING SYSTEM WITH RESOURCE MANAGED DATABASE CLONING

CROSS REFERENCE TO RELATED APPLICATION(S)

This application is a continuation of U.S. patent application Ser. No. 15/284,298, filed Oct. 3, 2016, which is a continuation of U.S. patent application Ser. No. 14/993,726, filed Jan. 12, 2016, which claims the benefit of U.S. Provisional Application No. 62/106,796, filed Jan. 23, 2015, each of which is incorporated herein in its entirety by reference.

TECHNICAL FIELD

The present disclosure is generally related to information technology, and in particular a distributed computing system that performs data cloning operations.

BACKGROUND

Modern computing systems often include large systems including multiple servers or processors communicating over local-area or wide-area networks serving multiple clients. These systems can store very large amounts of data and process many transactions in a given time period. Maintaining optimal system performance and the collection and analysis of transactional and dimensional data can be difficult or suboptimal in current systems.

SUMMARY

Disclosed herein are systems, methods, and apparatuses for cloning database instances.

In an implementation of an apparatus described herein, the apparatus includes a control device coupled to computerized servers through a network, the computerized servers comprising at least a first computerized server including a primary database and a second computerized server including a secondary database, and at least some of the computerized servers storing backup database instances respectively constructed by copying data from one of the primary database or the secondary database. The control device includes a processor and machine-readable instructions stored in a non-transitory storage medium that cause the processor to perform a cloning operation by identifying a most recently updated one of the backup database instances as a first backup database instance, upon a condition that a time difference between an update time of the first backup database instance and an update time of a second backup database instance is below a defined value, selecting, as a source instance for cloning, one of the first backup database instance or the second backup database instance satisfying at least one of a distance criteria or logical criteria with respect to a designated database instance, upon a condition that the time difference is above the defined value, selecting, as the source instance for cloning, the first backup database instance, and cloning the source instance to a target instance.

Another apparatus described herein includes a control device coupled to computerized servers through a network, the computerized servers comprising at least a first computerized server including a primary database and a second computerized server including a secondary database, and at least some of the computerized servers storing backup database instances respectively constructed by copying data from one of the primary database or the secondary database. The control device includes a processor, and machine-readable instructions stored in a non-transitory storage medium that cause the processor to perform a cloning operation by identifying a most recently updated one of the backup database instances as a first backup database instance, upon a condition that a time difference between an update time of the first backup database instance and an update time of a second backup database instance is below a defined value, selecting, as a source instance for cloning, one of the first backup database instance or the second backup database instance satisfying at least one of a distance criteria or logical criteria with respect to a designated database instance, upon a condition that the time difference is above the defined value, selecting, as the source instance for cloning, the first backup database instance, conducting a preparatory operation, and upon passing of the preparatory operation, cloning the source instance to a target instance.

A method for cloning database instances described herein includes receiving or detecting, by a control device, a prescribed command, event trigger, or other occurrence, the control device coupled to computerized servers through a network, and the computerized servers comprising at least a first computerized server including a primary database and a second computerized server including a secondary database, and at least some of the computerized servers storing backup database instances respectively constructed by copying data from one of the primary database or the secondary database. The method also includes, responsive to receiving or detecting the prescribed command, event trigger, or other occurrence, perform a cloning operation by identifying a most recently updated one of the backup database instances as a first backup database instance, upon a condition that a time difference between an update time of the first backup database instance and an update time of a second backup database instance is below a defined value, selecting, as a source instance for cloning, one of the first backup database instance or the second backup database instance satisfying at least one of a distance criteria or logical criteria with respect to a designated database instance, upon a condition that the time difference is above the defined value, selecting, as the source instance for cloning, the first backup database instance, and cloning the source instance to a target instance.

BRIEF DESCRIPTION OF THE DRAWINGS

The description herein makes reference to the accompanying drawings wherein like reference numerals refer to like parts throughout the several views unless otherwise noted.

DETAILED DESCRIPTION

Figure 1:
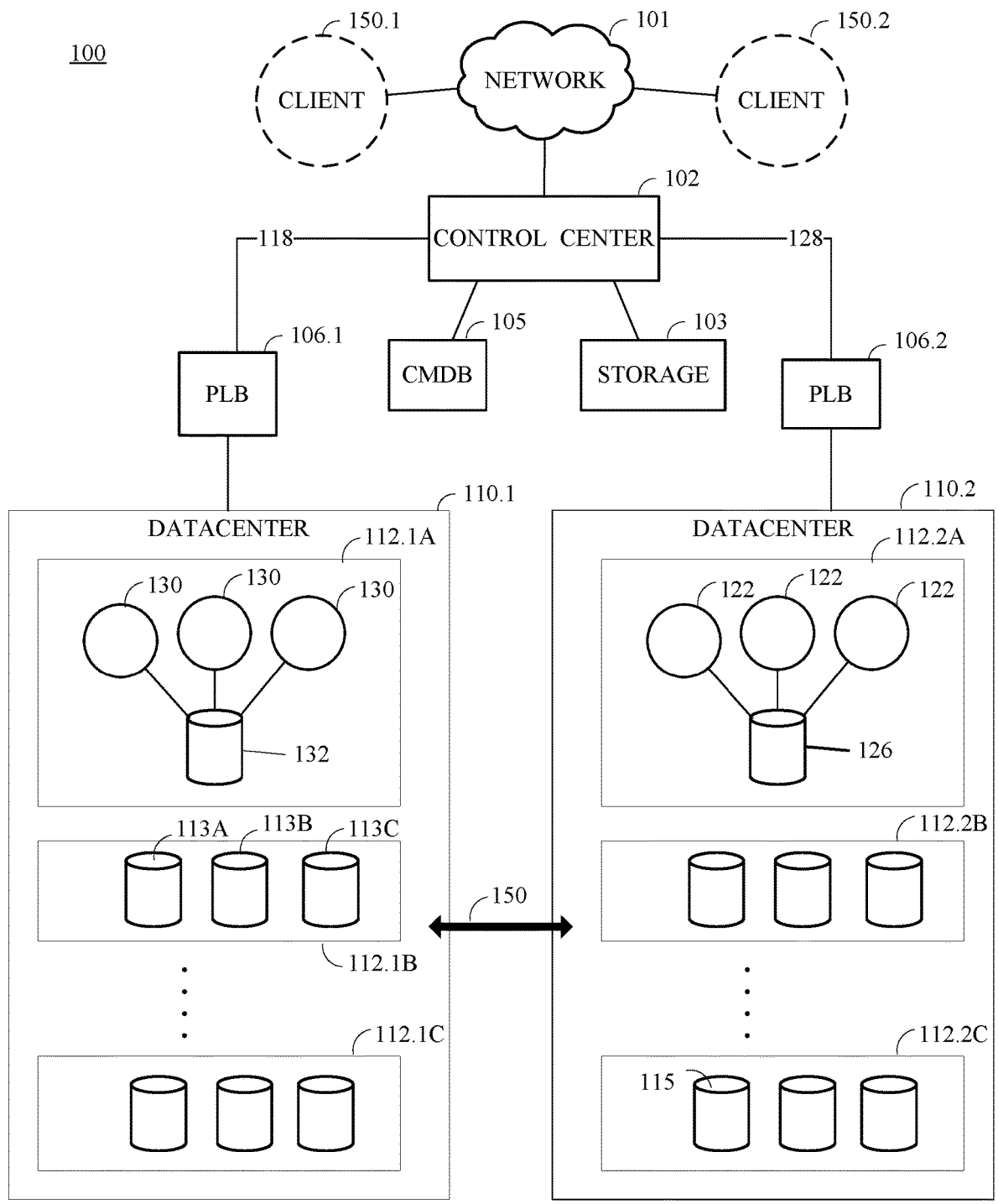
FIG. 1 is a block diagram of a distributed computing system.

The nature, objectives, and advantages of the present disclosure will become more apparent to those skilled in the art after considering the following detailed description in connection with the accompanying drawings.

Broadly, one implementation comprises a computer-driven distributed data storage and management system embodied by multiple datacenters. The datacenters store and provide a primary database for access by remote customers. A standby database mirrors the primary database, and is available to quickly perform a failover operation. The data embodied in the primary and standby databases may be referred to as a data source. The datacenters also store various backup databases that duplicate the data source for use in case of error, loss, disaster, file corruption, equipment failure, and the like.

In response to client input, the datacenter performs cloning operations. Cloning refers to replication of a data source, database management software, and other applications, nodes, or instances required to provide the data source as a database. This disclosure provides a cloning process that minimizes or eliminates impact to the data source, reduces data copy time from data source to target instance, and optimizes data freshness and data copy time.

Cloning is performed using a backup database corresponding to the primary and/or standby database. Before a cloning operation is carried out, one or more of the datacenters compare the freshness of the available backups. This comparison is configurable. For example, two backups may be considered to have the same freshness if they were last updated within a given time, such as one hour, of each other.

The clone target may reside in a different datacenter than the datacenter of the clone source. If two backups have the same freshness, then the datacenter of the source is selected so that data source is in the same datacenter as the target instance, or as physically proximate as possible. In addition to the cloning operation, this disclosure sets forth a variety of improvements implemented before and during cloning. Some example hardware components and interconnections of this digital data processing system and the related network are described as follows, and the functionality of these systems are separately discussed further below.

In one example, some or all of the features of this disclosure may be implemented in the context of cloud computing. Cloud computing can provide various advantages over traditional computing models, including the ability to allocate shared resources amongst many different customers. Under traditional computing models, computing resources are typically allocated to a single customer or entity and substantial portions of those resources may remain unused or underused.

Computing resources of cloud computing infrastructure may be allocated, for example, using a multi-tenant or a single-tenant architecture. Under a multi-tenant architecture, installations or instantiations of application, database, and/or other software application servers may be shared amongst multiple customers. For example, a single web server (e.g., a unitary Apache installation), application server (e.g., unitary Java Virtual Machine) and/or a single database server catalog (e.g., a unitary MySQL catalog) may handle requests from multiple customers. In a multi-tenant architecture, data or applications used by various customers can be commingled or shared. In an implementation of this architecture, the application and/or database server software can distinguish between and segregate data and other information of the various customers using the system. For example, database records belonging to a particular customer may be identified using a customer_id field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an example implementation, a customer instance is composed of four web server instances, four application server instances, and two database server instances. As previously described, each of these server instances may be located on different physical servers and each of these server instances may share resources of the different physical servers with a number of other server instances associated with other customer instances. The web, application, and database servers of the customer instance can be allocated to two different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server can replicate data to the standby database server.

The cloud computing infrastructure can be configured to direct traffic to the primary pair of web servers, which can be configured to utilize the primary pair of application servers and primary database server respectively. In a failure scenario, the secondary servers may be converted to primary servers. The application servers can include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances can be configured with a database configuration and schema to facilitate the operation of the platform. For example, the database server instance can be configured with various tables for storing metadata about applications, tables/fields, menus, forms, business rules, scripts, and custom UI elements that are used to customize the appearance and operation of the customer instance. In some implementations, the application servers can include web server functionality and the web servers can be omitted.

In an alternative implementation, a customer instance may include only two application servers and one database server. In a given cloud infrastructure system, different implementations of customer instances may be used for different customer instances at the same time. Other configurations and implementations of customer instances may also be used.

The proper allocation of computing resources of a physical server to an instance of a particular software server, such as a database server instance, can be important to the efficient and effective functioning of the cloud infrastructure. If too few resources are allocated, performance of the services provided to the customer using the database server may be degraded. If too many resources are allocated, computing resources may be wasted as the extra allocated resources may not meaningfully increase the performance of the services provided to the customer. Repeated over allocation of computing resources may require that additional server hardware be purchased to satisfy the over allocation, resulting in a greater than necessary cost for providing the cloud infrastructure. In current systems, the amount of possible RAM may be constrained per physical server and the utilization of RAM may be relatively higher than other available computing resources, such as processing cycles (e.g., CPU) and storage (e.g., solid state and magnetic hard disks). Thus, it may be advantageous to more precisely allocate the amount of RAM to each database server instance due to the relative scarcity of RAM resources. The techniques and devices described herein may relate to the allocation of cloud computing resources, one aspect of which is the allocation of RAM resources to database servers installed on a particular physical server machine. An initial allocation of RAM to a database server may be generated and the database server may be provisioned using the initial allocation. Periodic measurements can be taken of the database server tables and buffer sizes and ratios are calculated. Based on the ratios, a desired memory allocation can be determined, for example using a pre-determined lookup table of memory allocation sizes to the calculated ratios. The desired memory allocation can be compiled in a report. The report can include functionality to permit a user to initiate an automated action to re-provision the database server using the desired memory allocation. Alternatively, the re-provisioning of the database server can be initiated automatically without user interaction. One implementation of this disclosure concerns a distributed computing system.

FIG. 1 is a block diagram of an example of a distributed computing system 100. The system 100 includes a primary datacenter 110.1 and a secondary datacenter 110.2 (collectively, datacenters 110). A greater number of datacenters may be used, with two being shown for ease of explanation. The datacenters 110 are each coupled to a control center 102 by way of proxy load balancers 106.1, 106.2 (collectively, proxy load balancers 106). The control center 102 is linked to one or more clients 150.1, 150.2 (an example client instance, or collectively, clients 150) via a communications network 101. Broadly, the control center 102 directs operations of the datacenters 110 on behalf of the clients 150. Some examples of these operations include hosting storage for the clients 150 and running applications for the clients 150. To that end, the system 100 may comprise a store and retrieve module and a cloning module, each containing algorithms that can be executed on a processor of the control center 102. In one implementation, the system 100 constitutes an embodiment of cloud computing, performed on behalf of the clients 150. In one example, the system 100 comprises a high availability system, where each of the data centers 110 comprises a massively parallel execution engine.

The control center 102 comprises at least one digital data processing machine. This is exemplified by a server, workstation, desktop computer, notebook computer, mainframe computer, datacenter, or other hardware appropriate to carry out the functionality described herein. In some implementations, the control center 102 is coupled to or includes storage 103 containing a predefined list of machine-readable orchestrations. An orchestration names, represents, signifies, embodies, lists, or incorporates a set of machine-executable actions that carry out the orchestration. In an embodiment where the orchestrations do not contain the corresponding machine-executable actions, then the storage 103 may additionally contain the actions associated with each orchestration. In contrast to the illustrated embodiment, the orchestrations may instead be provided in storage outside of the control center 102 but nevertheless accessible by the control center 102. The storage 103 encompasses machine-readable storage devices and media of all types, as well as storage by virtue of being programmed into a circuitry such as an application-specific integrated circuit (ASIC), Field-programmable gate array (FPGA), digital signal processor (DSP), and such. Numerous examples of storage and logic circuits are explained in detail below.

The control center 102 is also coupled to or includes a configuration management database (CMDB) 105. The CMDB 105 comprises a database containing entries for information technology (IT) assets such as systems, software, facilities, products, network, storage, and the like forming the system 100. These assets, as represented in the CMDB 105, may be referred to as configuration items (CIs). Configuration item types may also include business types, such as organizations, people, markets, products, vendors, and partners. The CMDB 105 also describes the dependencies or other relationships among the configuration items. CMDBs are widely used, and many structural and operational details of the CMDB 105 will be apparent to those of ordinary skill in the relevant art having the benefit of this disclosure.

As mentioned above, the control center 102 is linked to the clients 150 via the communications network 101. Although illustrated as a central hub for ease of illustration, the communications network 101 may be implemented by any form of communication link that supports data exchange between the control center 102 and the clients 150 in satisfaction of the functions and purposes expressed herein. In this regard, the communications network 101 may be configured as an overlay network, or a bus, mesh, tree, ring, star, peer-to-peer, overlay, or any combination or permutation of these or other known networks. The communications network 101 or one or more subcomponents thereof may include the public Internet or a corporate or government Intranet, for example. The communications network 101 may additionally or alternatively include one or more local area networks, wide area networks, Intranets, Extranets, Internetworks, Wi-Fi networks, or any other suitable technology using wires, radiofrequency, microwave, satellite, cellular, optical, or other telecommunications.

The proxy load balancers 106 link the control center 102 to the datacenters 110. Each load balancer 106.1, 106.2 is configured to direct traffic to respective servers and processing nodes located within its datacenter 110.1, 110.2. In regard to proxy services, in one example the proxy load balancers 106 provide a single Internet-delivered service to remote clients via the communications network 101, where this service is actually provided by a server farm composed of the computerized servers of the datacenters 110. The proxy load balancers 106 also coordinate requests from remote clients to the datacenters 110, simplifying client access by masking the internal configuration of the datacenters 110. The proxy load balancers 106 may serve these functions by directing clients to processing nodes as configured directly or via DNS. In regard to load balancing, the proxy load balancers 106 may be configured to direct traffic to the secondary datacenter 110.2 in the event the primary datacenter 110.1 experiences one of many enumerated conditions predefined as failure.

The datacenters 110 include a plurality of computerized servers. In one example, each datacenter 110.1, 110.2 is provided by one or more physical racks of computing machines. More particularly, the primary datacenter 110.1 includes servers 112.1A, 112.1B, and 112.1C, and the secondary datacenter 110.2 includes servers 112.2A, 112.2B, and 112.2C, although the number of servers may be increased or decreased in practice to suit the needs and context of the implementation. These computerized servers respectively comprise one or more digital processing machines, which may be exemplified by a server, workstation computer, or other hardware appropriate to carry out the functionality described herein, as described more fully below. The servers include client data storage as well as further storage containing machine-executable tasks. These stored instructions may be stored or programmed into the respective servers. For instance, the instructions may be contained in storage accessible by a server, incorporated into circuitry of the server, incorporated into code executable by the server, or other means.

As described previously, storage of the servers includes client data storage. An example of this is the primary database 132 in the datacenter 110.1, and the standby database 126 in the datacenter 110.2. The datacenters 110 operate in such a manner that the standby database 126 provides an exact or substantially exact mirror of the primary database 132.

Figure 6:
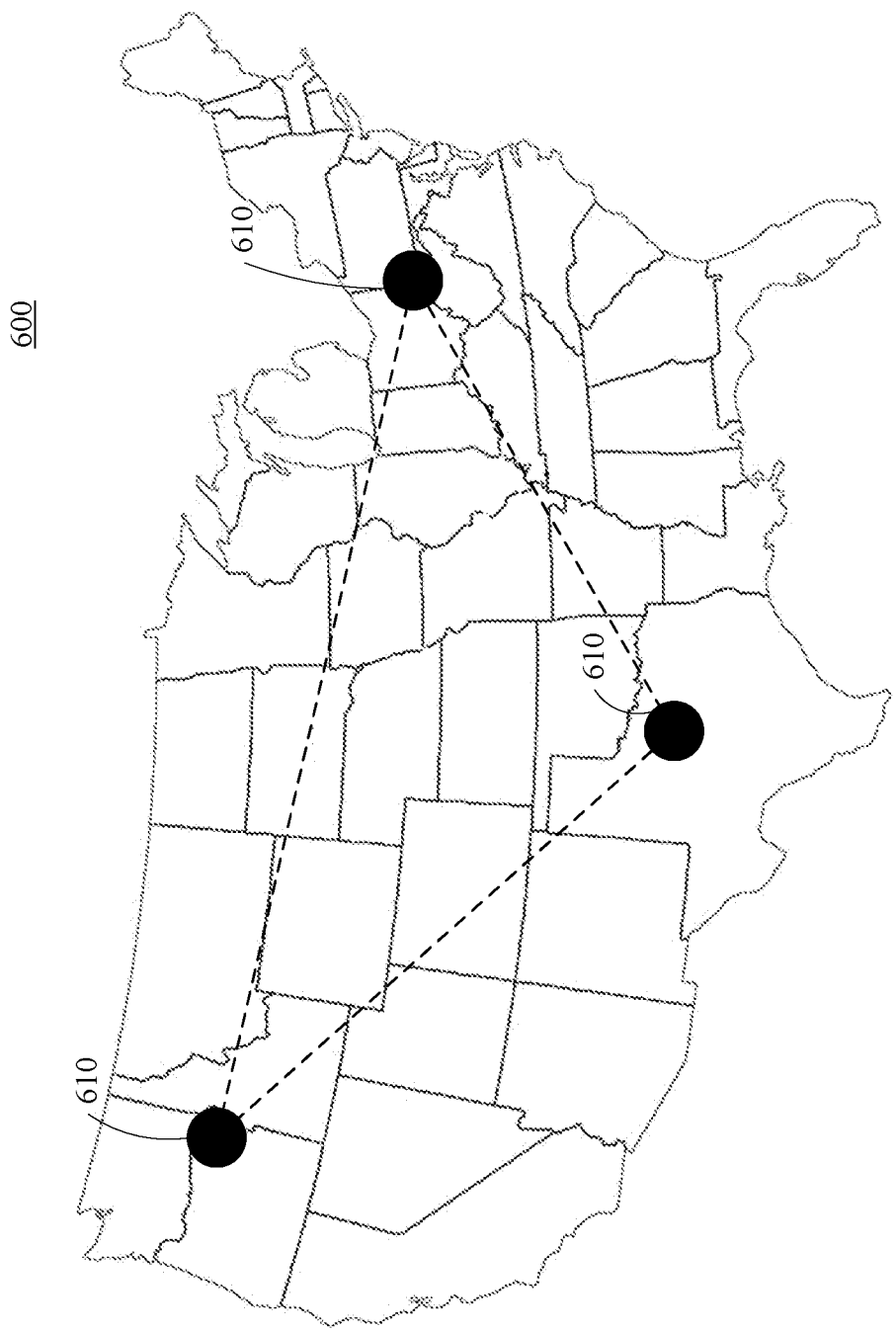
FIG. 6 is a map showing physical locations of datacenter hardware.

The data represented by the primary and standby databases 132, 126 may be referred to as a data source or source instance. In addition to cloning operations discussed herein, the datacenters 110 are programmed to conduct multiple backups of the data source. Some examples of these backups are shown as backups 113A-113C and 115 in FIG. 1. In practice, a greater or lesser number of backups may be implemented in practice, and some of these may reside in data centers that are provided in addition to the datacenters 110. Relatedly, the datacenters 110 and any further datacenters may be physically sited in geographically diverse locations. In this regard, FIG. 6 is a map 600 showing physical locations of datacenter hardware. As illustrated, datacenters 610 are located in geographically distinct sites across the United States.

The datacenters 110 (and the datacenters 610) include processing nodes 130 and 122, although a greater or lesser number may be implemented in practice. The processing nodes 130, 122 comprise processing threads, virtual machine instantiations, or other computing features of the datacenters 110 that run programs on behalf of (e.g., remote) clients 150, and exchange related data with the clients 150 via the communications network 101. Some of the processing nodes 130, 122 may be dedicated to database management functions involving databases such as databases 132, 126.

A processing node 130 or 122 runs an application program or conducts a database function on behalf of one of the clients 150 and according to directions of the control center 102. In one implementation, each processing node 130, 122 comprises a virtual machine instantiation performing certain machine-executable actions. Alternatively, a processing node 130, 122 may comprise an application. A processing node 130, 122 may have its own operating system, or not, depending upon the implementation.

The datacenters 110 include a messaging infrastructure, which may include one or more communications links, busses, backplanes, cables, wires, queues, buffers, networks, or other interconnection components. The messaging infrastructure is not shown for ease of illustration of the other features of the system. The messaging infrastructure includes one or more interlinks 118, 128 to support inter-datacenter communications.

Figure 3:
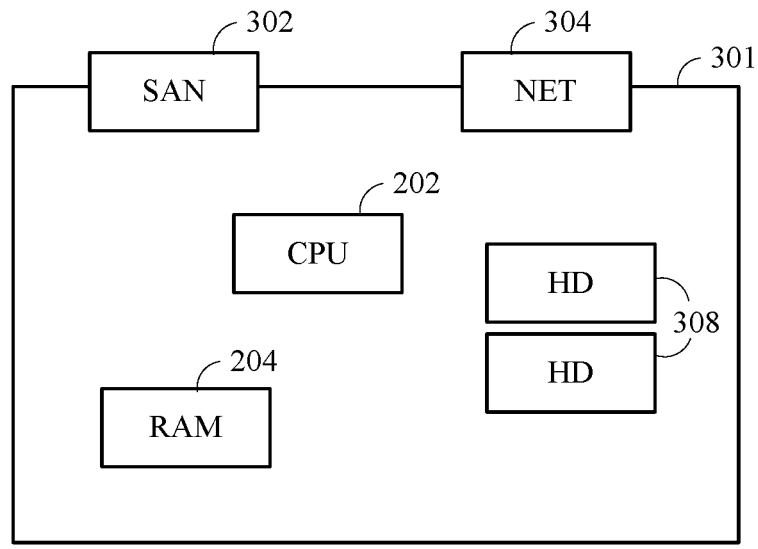
FIG. 3 is a block diagram of an example server.

Further illustration of hardware that can be used in implementing the teachings herein is shown by FIG. 3, which is a block diagram showing the hardware components of an example computerized server 112. The example computerized server 112 includes a storage enclosure 301 that contains a storage area network (SAN) unit 302, networking hardware 304, a processor (such as CPU) 202, and a memory (such as RAM) 204. The computerized server 112 also includes one or more digital data storage devices, which in this case are exemplified by hard disk drives 308.

Figure 4:
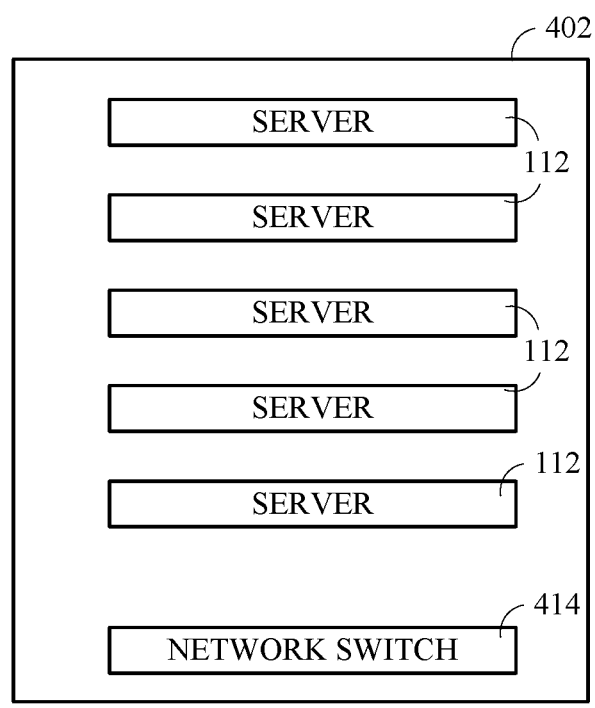
FIG. 4 is a block diagram of an example datacenter.

Further illustration of the hardware components of an example datacenter is shown in the block diagram of FIG. 4. The example datacenter 400 includes a storage rack 402 containing servers 112 and one or more network switches 414. The systems illustrated above include numerous components that may be implemented with data processing functionality. In any of these cases, such data processing features may be implemented by one or more instances of hardware, software, firmware, or a subcomponent or combination of the foregoing. Some example hardware of these subcomponents is described as follows.

Figure 2:
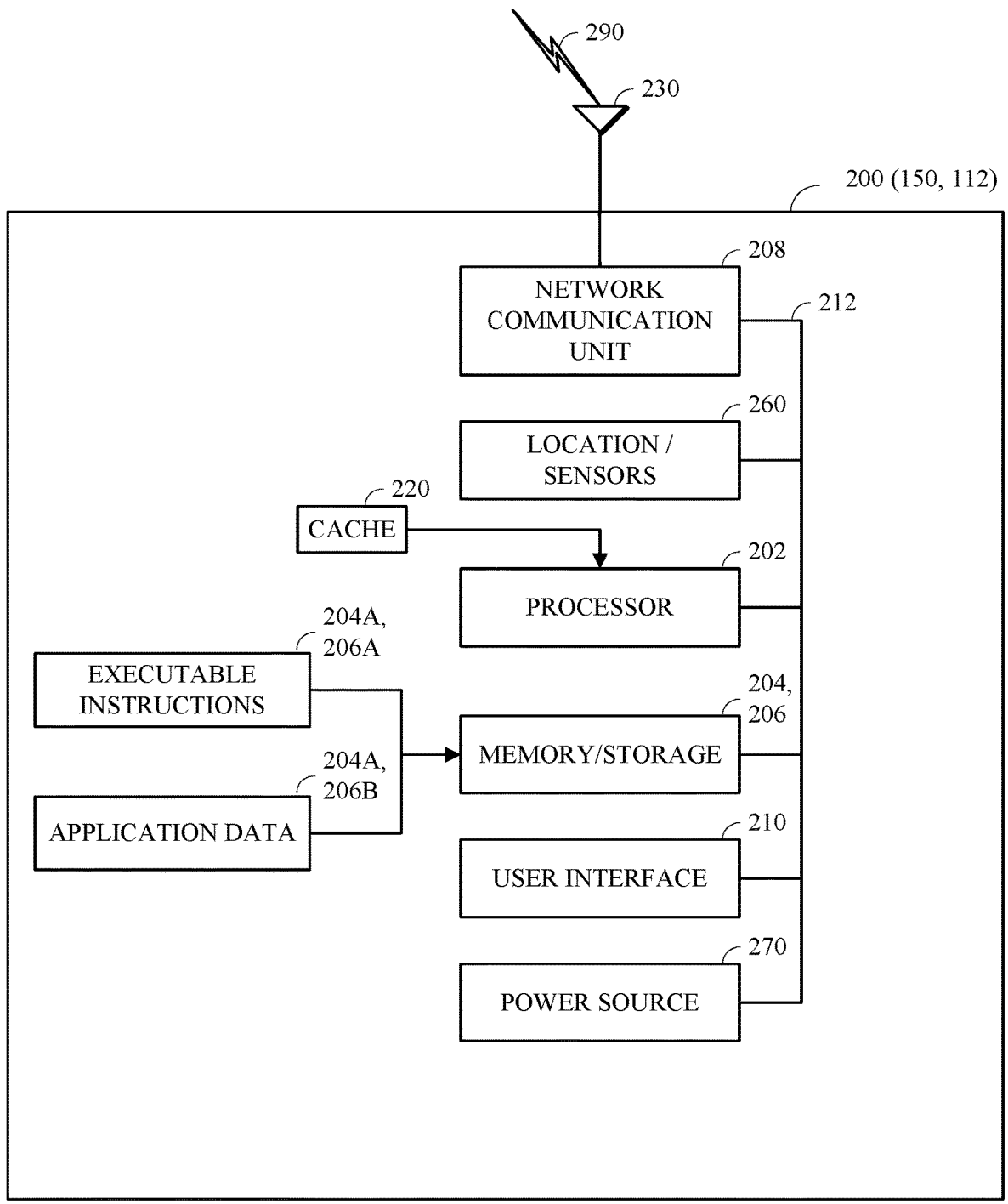
FIG. 2 is a block diagram of a digital data processing machine.

FIG. 2 is a block diagram of an example internal configuration of a computing device 200, such as a client 150 or server 112 of the computing system 100 as shown in FIG. 1, including an infrastructure control server of a computing system. As previously described, clients 150 or servers 112 may take the form of a computing system including multiple computing units, or in the form of a single computing unit, for example, a mobile phone, a tablet computer, a laptop computer, a notebook computer, a desktop computer, a server computer, or the like.

The computing device 200 can include a number of components, as illustrated in FIG. 2. A processor 202, can be a central processing unit, such as a microprocessor, and can include single or multiple processors, each having single or multiple processing cores. Alternatively, the processor 202 can include another type of device, or multiple devices, capable of manipulating or processing information now-existing or hereafter developed. When multiple processing devices are present, they may be interconnected in any manner, including hardwired or networked, including wirelessly networked. Thus, the operations of the processor 202 can be distributed across multiple machines that can be coupled directly or across a local area or other network. The processor 202 can be a general purpose processor or a special purpose processor.

A memory 204 can be in the form of Random Access Memory (RAM) or any suitable non-permanent storage device that is used as memory. The memory 204 can include executable instructions and data for immediate access by the processor 202. The memory 204, when implemented as RAM, may comprise one or more DRAM modules such as DDR SDRAM.

Alternatively, the memory 204 can include another type of device, or multiple devices, capable of storing data for processing by the processor 202 now-existing or hereafter developed. The processor 202 can access and manipulate data in the memory 204 via bus 212. The processor 202 may utilize a cache 220 as a form of localized fast memory for operating on data and instructions.

A storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. The storage 206 can include executable instructions 206A and application files/data 206B, along with other data. The executable instructions 206A can include, for example, an operating system and one or more application programs for loading in whole or part into the memory 204 (e.g., with RAM-based executable instructions 204A and application files/data 204B) and to be executed by the processor 202. The executable instructions 206A may be organized into programmable modules or algorithms, functional programs, codes, and code segments designed to perform various functions described herein.

The term module, as used herein, can be implemented using hardware, software, or a combination thereof. A module may form a part of a larger entity, and may itself be broken into sub-entities. When a module is implemented using software, this software can be implemented as algorithmic components comprising program instructions stored in a memory, the instructions designed to be executed on a processor. The term "module" does not require any specific form of coding structure, and functional aspects of different modules may be independent but also may overlap and be performed by common program instructions. For example, a first module and a second module may be implemented using a common set of program instructions without distinct boundaries between the respective and/or common instructions that implement the first and second modules.

The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files/data 206B can, for example, include user files, database catalogs and configuration information. In an implementation, the storage 206 includes instructions to perform the cloning techniques described herein. Storage 206 may comprise one or multiple devices and may utilize one or more types of storage, such as solid state or magnetic storage.

The computing device 200 can also include one or more input/output devices, such as a network communication unit 208 and an interface 230 that may have a wired communication component or a wireless communications component 290, which can be coupled to the processor 202 via the bus 212. The network communication unit 208 can utilize any of a variety of standardized network protocols, such as Ethernet, TCP/IP, to name a few of many possible protocols, so as to effect communications between devices. The interface 230 can comprise one or more transceiver(s) that utilize the Ethernet, power line communication (PLC), WiFi, infrared, General Packet Radio Service of the global system for mobile communications (GPRS/GSM), code division multiple access (CDMA), etc.

A user interface 210 can include a display, positional input device (such as a mouse, touchpad, touchscreen, or the like), keyboard, or other forms of user input and output devices. The user interface 210 can be coupled to the processor 202 via the bus 212. A user interface (such as a graphical user interface GUI) 210 is specifically a user interface that allows people to interact with a device in a graphical display. The user interface 210 can be broken down into an input portion, an output portion, and a processor that manages, process, and interacts with the input and output portions. The input portion can accept input created by elements such as a mouse, touchpad, touchscreen, or the like. The output portion of the user interface 210 can generate input displayable on some form of a display, such as a cathode-ray tube (CRT), liquid crystal display (LCD), and light emitting diode (LED) display, such as an organic light emitting diode (OLED) display. The display is generally formed of a grid of pixels, each of which can take on various illumination and optionally color values that are grouped together and arranged to form various higher-level entities (in pixel regions) on the display. These pixel regions can make up icons, windows, buttons, cursors, control elements, text, and other displayable entities. The display utilizes graphical device interface that typically comprises a graphics processor specifically designed to interact with the hardware of the display, and may accept high-level instructions from other processors to reduce demands on them. The graphical device interface typically has its own memory that serves as a buffer and also allows manipulation of stored data by the graphics processor. Operation of the display thus typically involves the graphics processor accessing instructions and data stored memory to modify pixel regions on the display for the user.

Other implementations of the internal configuration or architecture of the computing device 200 to implement clients and servers are also possible. For example, a computing device 200 may omit a display as the user interface 210. The memory 204 or the storage 206 can be distributed across multiple machines such as network-based memory or memory in multiple machines performing the operations of clients or servers. Although depicted here as a single bus, the bus 212 can be composed of multiple buses, that may be connected to each other through various bridges, controllers, and/or adapters. The computing device 200 may contain any number of sensors and detectors that monitor the computing device 200 itself or the environment around the computing device 200, or the computing device 200 may contain a location identification unit 260, such as a GPS or other type of location device as shown in FIG. 2. The computing device 200 may also contain a power source 270, such as a battery, so that the unit can operate in a self-contained manner. These may communicate with the processor 202 via the bus 212.

As used herein, the term "computer" may be used to refer to any of the digital data processing machines, devices, circuitry, instance, or embodiments discussed herein as well as those that will be apparent to those of ordinary skill in the relevant art having the benefit of this disclosure.

As mentioned above, the disclosed components include or utilize various instances of digital data storage. Depending upon its application, this digital data storage may be used for various functions, such as storing data and/or storing machine-readable instructions. These instructions may themselves aid in carrying out various processing functions, or they may serve to install a software program upon a computer, where such software program is thereafter executable to perform other functions related to this disclosure.

In any case, the storage media may be implemented to digitally store machine-readable signals. One example is optical storage such as CD-ROM, WORM, DVD, digital optical tape, optical disk storage, or other optical storage. Another example is direct access storage, such as a "hard drive," redundant array of inexpensive disks (RAID), or another direct access storage device (DASD). Another example is serial-access storage such as magnetic or optical tape. Still other examples of digital data storage include electronic memory such as ROM, EPROM, flash PROM, EEPROM, memory registers, battery backed-up RAM, etc.

An example storage medium is coupled to a processor so the processor may read information from, and write information to, the storage medium. In the alternative, the storage medium may be integral to the processor. In another example, the processor and the storage medium may reside in an application-specific integrated circuit (ASIC) or other integrated circuit.

In contrast to storage media that contain machine-executable instructions, as described above, a different embodiment uses logic circuitry to implement some or all of the processing features described herein. Depending upon the particular requirements of the application in the areas of speed, expense, tooling costs, and the like, this logic may be implemented by constructing an ASIC having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, transistors, and the like), field programmable gate array (FPGA), programmable logic array (PLA), programmable logic device (PLD), and the like.

Figure 5:
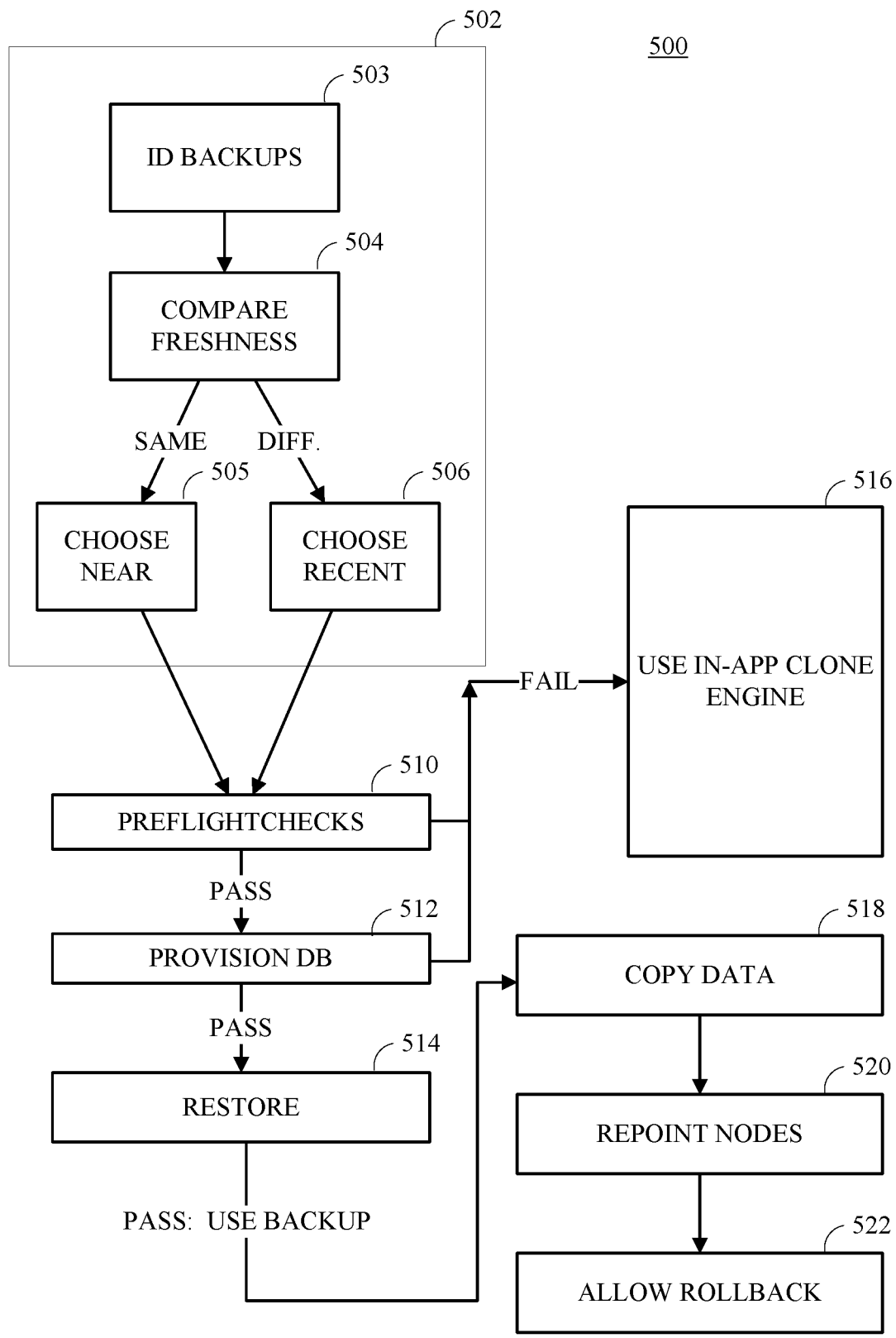
FIG. 5 is a flow chart of example operations performed by a distributed computing system.

Having described the hardware components and interconnections of the disclosed system, the operation of these components is now discussed. In this regard, FIG. 5 shows some example operations performed by a distributed computing system. The operations of any method, process, or algorithm described in connection with the embodiments disclosed herein may be embodied directly in hardware, firmware, software executed by hardware, circuitry, or a combination of these.

Without any intended limitation, the operations 500 are performed by the control center 102 in the illustrated implementation. The operations 500 concern preparation for, and execution of, a database cloning operation. In the illustrated example, the operations 500 are initiated in response to a command submitted by one of the clients 150. In a different case, the operations 500 may be initiated by the control center 102 or one of the datacenters 110 in accordance with housekeeping, database maintenance, regular or irregularly schedule or spontaneous events, or other automated tasks performed in the distributed computing system 100. Thus, the operations 500 may be initiated in response to receiving or detecting a prescribed command, event trigger, or any other occurrence.

The client command, event trigger, or other causality that initiates data cloning specifies a data source to use in the cloning operation. In the illustrated example, the data source comprises the data represented by the primary database 132 and its mirrored copy at the standby database 126. The command also identifies a target storage site or instance, such as one of the servers of the datacenters 110, or a more particular storage site such as a storage device, storage address, or other site designation.

There is a desire to maintain availability of the primary database to carry out client data functions, and the desire to maintain availability of the secondary or standby database in case of a failover operation. For these reasons, use of the primary and standby databases 132, 126 themselves for cloning operations is avoided if possible. Instead, the cloning operations will use one of the backup database instances such as 113A-113C, 115, etc.

At 502, the control center 102 selects the particular backup database instance to be used as a source for the cloning operation. At 503, the various available backup database instances whose data corresponds to the primary and secondary databases are identified. This may be carried out, in one implementation, by the control center 102 consulting the CMDB 105. At 504, the freshness of the various backup database instances is compared. Freshness may be represented by how recently each instance has been updated. In one implementation, the freshness of a backup database is indicated by the time that the most recent full or differential backup was performed to that database. To this end, operations at 504 may retrieve machine-readable records listing update times when the multiple backup database instances experienced updates from their data source. In one implementation, the backup times are listed in the CMDB 105. Once received, the differences in update times among the backup databases may be compared.

If the most recently updated backup database instance was updated within a prescribed time period of one or more other backup database instance, these backup databases are treated as having an equivalent update time. For example, if the most recent backup database instance was updated at 12:00 p.m. and subsequent backups occurred at 12:10 p.m. and 12:30 p.m., these will be treated as having equivalent freshness if the prescribed time period is set to one hour. In some implementations, the control center 102 is programmed to accept user selection, modification, or pre-configuration of the prescribed time period. That is, the user may choose the time criteria for deeming backup databases to have the same freshness. If the same at 504, processing advances to 505.

From among the backup database instances having equivalent update times or "freshness," the backup database instance that is the most proximate to a designated database instance is selected at 505. In one example, the designated database instance may comprise a testing instance such as the database instance 712, discussed below. In another example, the designated database instance may comprise the target site identified in the client command, event trigger, or other causality that initiated data cloning as discussed above.

Proximity may comprise a physical proximity such as distance or geography, or a logical proximity such as residence within the same datacenter or server or other machine or virtual device or logical construct. A combination of physical and logical criteria may be used. One example of proximity is expressing a preference to select a backup database instance from the same datacenter as the designated database instance, rather than a datacenter located across the country. In one implementation, proximity criteria is pre-programmed into the control center 102. However, the control center 102 may be programmed to accept user selection, modification, or pre-configuration of the proximity criteria. In this way, the user may choose specify the level of preferred nearness of a selected backup database to the designated database instance at 505.

In contrast to the foregoing, if the most recently updated backup database is significantly fresher than the other available backup databases, then this backup database is chosen at 506 for the cloning operation, regardless of, e.g., physical, proximity to the designated database instance. Significantly more fresh means having an update time that is earlier by the prescribed time period or more.

The operations subsequent to 505 and 506 initiate cloning to the target storage site using the selected backup database instance as a "source" for the cloning. In this sense, the selected backup database instance is considered a source instance for the target instance. After 505 or 506, and before operations where data is actually copied, preliminary operations are performed at 510, 512, and 514. One or more so-called preflight checks are performed at 510. One example is verifying that the backup database instance, selected at 505 or 506, actually exists. In this implementation, or instead of this implementation, a preflight check at 510 can determine if the selected backup instance is more than a given age. For example if the selected backup instance is more than twenty-four hours old, then the preflight check at 510 can fail such that the backup instance is not used. Another example of a preflight check possible at 510 comprises validating the backup database instance in the CMDB 105. If the cloning operation is being performed to replace an earlier database, then this data may also be verified in the CMDB 105. This operation ensures that the CMDB 105 contains correct data for the clone source (backup data instance) and clone target (database being replaced), and that data is not missing. Another example of a preflight check possible at 510 includes verifying that the selected backup database instance is not stale with respect to its data source. For example, if the primary database 132 was updated after the selected backup database instance, then the backup database instance is considered stale and failure of this preflight check at 510 occurs. This may occur when, for example, the source schema has changed, indicating that the backup data might not be able to be restored properly. Another example of a preflight check at 510 includes determining whether automation can read the source and target version. If any preflight check fails, then processing advances to 516, which is described below.

Figure 7:
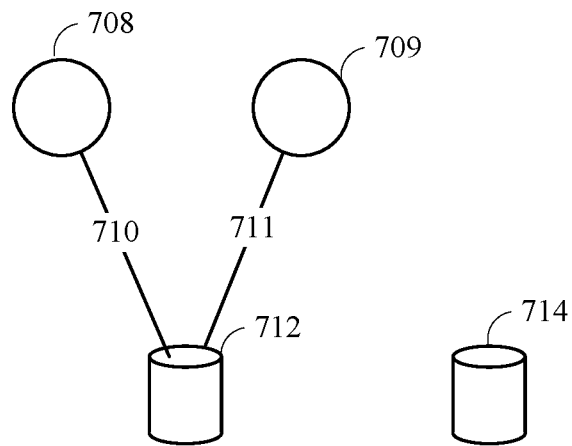
FIGS. 7-9 are block diagrams of an example of cloning sub operations.
Figure 8:
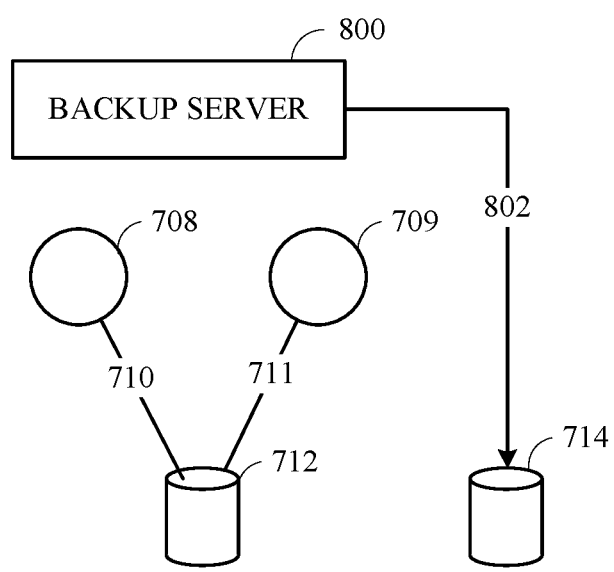
Figure 9:
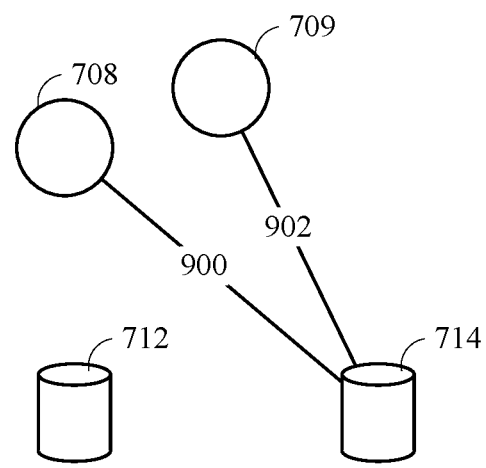

If all preflight checks pass at 510, then the target database instance is provisioned at 512. This involves appropriating storage hardware and other operations to ready the ultimate target database instance for access by the clients 150. This is explained with reference to FIGS. 7-9, which are block diagrams of some example cloning sub operations. In the currently illustrated example, the system includes various testing instances, which are clones made from backups of the primary or standby databases 132, 126. Each testing instance is a non-production instance available for an associated client 150 to experiment with different changes in configuration, software, data structures, and the like. FIG. 7 illustrates a testing instance comprised of nodes 708 and 709 connected by respective links 710, 711 to database instance 712. This provides one example context for conducting cloning, and namely, the purpose of cloning of a backup database (such as 113A-113C or 115) to provide a more current testing instance for use by the associated one of the clients 150.

FIG. 7 illustrates the newly provisioned database at 714. In one implementation, the newly provisioned database 714 has the same size capacity as the database instance 712 of the testing instance. This reduces clone downtime and allows the customer to optionally roll back quickly after the clone is completed, as discussed below. In one implementation, provisioning at 512 first attempts to provision to the same server as the testing instance, but if there is insufficient capacity, provisioning at 512 attempts to complete the provisioning in the same datacenter as the testing instance. Provisioning a new database can fail due to capacity or other issues. In this case, provisioning at 512 fails, and the operations proceed to 516, which is described below.

If provisioning passes at 512, however, operations proceed to 514, which conducts a restore operation from the selected backup database instance. Broadly, the restore operation at 514 includes unzipping the selected backup database instance and checking or verifying the backup data, metadata, and structure. In an example, the restore operation may be conducted using a program such as PERCONA XTRABACKUP, which is an open source hot backup utility for MySQL. Excluded tables may be filtered out as predefined by the system or as specified by customer input. If the restore operation at 514 fails, processing advances to 516.

As mentioned above, if any of operations 510, 512, or 514 fail, then the selected backup database is not used as a source for the cloning operation. In this event, cloning is conducted using an in-application cloning engine, as indicated at 516. The in-application cloning engine uses a node such as 130 or 122 to perform the requested clone directly from the primary database 132 or standby database 126, during which time the data remains available to the client. The in-application cloning operation may be referred to as a fallback operation. By using in-application cloning only as a fallback feature, this avoids using in-application engines to conduct clones unless this is necessary, thereby conserving processing and storage resources associated with the primary and standby databases 132, 126. More particularly, this reduces resource usage on the data source, thereby reducing impact to other customer instances deployed to the same physical machine. This also reduces the amount of time required for the clone operation and the clone process workflow. Fallback reduces the duration of the impact to the end customer, among other benefits.

In contrast to the above, if all of 510, 512, and 514 pass, then cloning will be performed using the selected backup database instance as planned, as shown starting at 518. At 518, copying of data begins. In an implementation, this is performed by applying a data synchronization tool such as RSYNC to the target database instance that was provisioned at 512, and importing preserved data. To further illustrate operations at 518, reference is made to FIG. 8, which depicts a backup server 800 copying data to the newly provisioned database 714 via a link 802.

After operations at 518, a node repoint and version mismatch are performed at 720. First, the links 710, 711 (FIGS. 7 and 8) from application nodes 708, 709 may be severed or moved so that new links 900, 902 (FIG. 9) link the nodes 708, 709 to the newly provisioned database 714, now populated with data from the backup server 800 as explained above. If the testing instance and the target instance have different versions, the appropriate version is downloaded or installed at the nodes 708, 709 at 720. Additionally or alternatively, the configuration file of the target nodes used in the new database is updated at 720. Upon repoint of the nodes 708, 709, and optional version updates, the nodes 708, 709 are restarted to bring the database 714 of the target instance online.

Referring again to FIG. 5, and even after repointing the nodes at 520, the process 500 allows roll back for a time period at 522. The system may allow this time period to be client-configurable. For example, the time period may be twenty-four hours such that the database instance 712 of the testing instance is retired after twenty-four hours. Before the database instance 712 is retired, the database 714 is subject to being rolled back by repointing the nodes 708, 709 to the old database instance 712. After the time period, however, the cloning process 700 is complete with the retirement of the database instance 912. Rollback may be initiated according to client request or a system event or condition.

All or a portion of aspects of the teachings described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, ASICs, programmable logic arrays, optical processors, programmable logic controllers, microcode, microcontrollers, servers, microprocessors, DSPs, or any other suitable circuit. In the claims, the term "processor"

should be understood as encompassing any of the foregoing hardware, either singly or in combination.

For example, one or more computing devices can include an ASIC or programmable logic array such as an FPGA configured as a special-purpose processor to perform one or more of the operations or operations described or claimed herein. An example FPGA can include a collection of logic blocks and RAM blocks that can be individually configured and/or configurably interconnected in order to cause the FPGA to perform certain functions. Certain FPGAs may contain other general or special purpose blocks as well. An example FPGA can be programmed based on a hardware definition language (HDL) design, such as VHSIC Hardware Description Language or Verilog.

The aspects herein may be described in terms of functional block components and various processing operations. Such functional blocks may be realized by any number of hardware and/or software components that perform the specified functions. For example, the described aspects may employ various integrated circuit components, e.g., memory elements, processing elements, logic elements, look-up tables, and the like, which may carry out a variety of functions under the control of one or more microprocessors or other control devices. Similarly, where the elements of the described aspects are implemented using software programming or software elements this disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the aspects of the disclosure could employ any number of conventional techniques for electronics configuration, signal processing and/or control, data processing and the like. The words "component" and "element" are used broadly and are not limited to mechanical or physical embodiments or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples may be implemented using machine readable instructions in the form of code for operation of any or any combination of the aforementioned computational hardware. Computational code may be implemented in the form of one or more modules by which individual or combined functions can be performed as a computational tool, the input and output data of each module being passed to/from one or more further module during operation of the methods and systems described herein.

Information, data, and signals may be represented using a variety of different technologies and techniques.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation," "an aspect," or their variations throughout is not intended to mean the same embodiment, aspect, or implementation unless described as such.

The particular implementations shown and described herein are illustrative examples and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. Many alternative or additional functional relationships, physical connections or logical connections may be present in a practical device. Moreover, no item or component is essential to the teachings herein unless the element is specifically described as "essential" or "critical".

The use of "including," "comprising," or "having," and variations thereof herein is meant to encompass the items listed thereafter and equivalents thereof as well as additional items. Unless specified or limited otherwise, the terms "connected" and "coupled" and variations thereof are used broadly and encompass both direct and indirect connections and couplings. Further, "connected" and "coupled" are not restricted to physical or mechanical connections or couplings.

The use of the terms "a" and "an" and "the" and similar referents in the context of describing the teachings herein (including following claims) should be construed to cover both the singular and the plural unless otherwise noted or clear from context. Furthery, the operations of all methods described herein are performable in any suitable order unless otherwise indicated herein or otherwise clearly contradicted by context. The use of any and all examples, or example language (e.g., "such as") provided herein, is intended merely to better illuminate features possible within the invention and does not pose a limitation on the scope of the invention unless otherwise claimed.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

Any references, including publications, patent applications, and patents, cited herein are hereby incorporated by reference to the same extent as if each reference were individually and specifically indicated as incorporated by reference and were set forth in its entirety herein.

The above-described aspects have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for cloning database instances, comprising:
   a control device coupled to computerized servers through a network, wherein the computerized servers comprise a first computerized server and a second computerized server, wherein at least some of the computerized servers are configured to store backup database instances respectively constructed by copying data from another database stored in the first computerized server or the second computerized server, the control device comprising:
   a processor; and
   machine-readable instructions stored in a non-transitory storage medium that cause the control device to perform a cloning operation at least in part by:
   identifying a most recently updated one of the backup database instances as a first backup database instance;
   identifying another of the backup database instances that was updated most recently after the first backup database instance as a second backup database instance;
   upon a first condition that that a time difference between an update time of the first backup database instance and an update time of the second backup database instance is less than a defined value, selecting, as a source instance for cloning, one of the first backup database instance or the second backup database instance satisfying at least one of a geographical proximity criterion or a logical proximity criterion with respect to a designated database instance, wherein the logical proximity criterion is based on whether the first backup database instance or the second backup database instance is hosted by a particular computerized server of the computerized servers that also hosts the designated database instance;
   upon a second condition that the time difference is greater than the defined value, selecting, as the source instance for cloning, the second backup database instance; and
   cloning the source instance to the designated database instance, wherein cloning the source instance to the designated database instance comprises copying data associated with the source instance from one or more of the computerized servers that stores the data associated with the source instance to the particular computerized server that hosts the designated database instance.

2. The apparatus of claim 1, comprising:
   a first datacenter coupled to the network, wherein the first datacenter comprises the first computerized server; and
   a second datacenter coupled to the network, wherein the second datacenter comprises the second computerized server, wherein the control device is located within a control center separate from the first datacenter and the second datacenter.

3. The apparatus of claim 2, wherein the control center is configured to receive a command or event trigger to initiate the cloning from one of the first datacenter or the second datacenter.

4. The apparatus of claim 2, wherein the designated database instance is located at a third computerized server within the first datacenter or the second datacenter.

5. The apparatus of claim 1, wherein the machine-readable instructions comprise instructions that cause the control device to perform the cloning at least in part by receiving a command or event trigger to initiate the cloning.

6. The apparatus of claim 5, wherein the computerized servers are disposed in respective datacenters of a plurality of datacenters coupled to the network, and the control device receives the command or the event trigger from one of the plurality of datacenters.

7. The apparatus of claim 1, comprising machine-readable records listing update times when each of the backup database instances most recently experienced an update.

8. The apparatus of claim 1, wherein the machine-readable instructions comprise instructions that cause the control device to perform the cloning at least in part by:
   conducting preparatory operations comprising conducting a preflight check, provisioning the designated database instance, or both; and
   in response to failure of at least one of the preparatory operations, using a processing node as the source instance.

9. A non-transitory, computer-readable medium comprising computer-readable code executable by one or more processors that, when executed by the one or more processors, causes a control device to perform operations for cloning database instances, comprising:
   identifying a most recently updated one of a plurality of backup database instances as a first backup database instance, wherein at least some of the plurality of backup database instances were constructed by copying data from one of a primary database or a secondary database;
   identifying another of the plurality of backup database instances that was updated most recently after the first backup database instance as a second backup database instance;
   upon a first condition that a time difference between an update time of the first backup database instance and an update time of the second backup database instance is less than a defined value, selecting, as a source instance for cloning, one of the first backup database instance or the second backup database instance satisfying at least one of a geographical proximity criterion or a logical proximity criterion with respect to a designated database instance, wherein the logical proximity criterion is based on whether the first backup database instance or the second backup database instance is hosted by a particular computerized server of the computerized servers that also hosts the designated database instance;
   upon a second condition that the time difference is greater than the defined value, selecting, as the source instance for cloning, the second backup database instance;
   conducting a preparatory operation; and
   upon passing of the preparatory operation, cloning the source instance to the designated database instance, wherein cloning the source instance to the designated database instance comprises copying data associated with the source instance from one or more of the computerized servers that store the data associated with the source instance to a corresponding computerized server that hosts the designated database instance.

10. The non-transitory, computer-readable medium of claim 9, wherein the preparatory operation comprises passing each of a plurality of preparatory operations.

11. The non-transitory, computer-readable medium of claim 10, wherein the computer-readable code for cloning the source instance to the designated database instance comprises computer-readable code executable by the one or more processors that, when executed by the one or more processors, causes the control device to perform operations comprising:
re-pointing an application node from a previously-created backup database to the designated database instance.

12. The non-transitory, computer-readable medium of claim 11, comprising computer-readable code executable by the one or more processors that, when executed by the one or more processors, causes the control device to perform operations comprising:
rolling back of the designated database instance to the previously-created backup database for a defined time period after the application node is linked to the designated database instance.

13. The non-transitory, computer-readable medium of claim 10, wherein the computer-readable code comprises computer-readable code executable by the one or more processors that, when executed by the one or more processors, causes the control device to perform the cloning upon failure of any one of the plurality of preparatory operations by performing operations comprising:
cloning the primary database or the secondary database to the designated database instance while maintaining availability of data of the one of the primary database or the secondary database to a connected client.

14. A method for cloning database instances, comprising:
receiving or detecting, via a control device, a command or an event trigger; and
in response to receiving or detecting the command or the event trigger, performing, via the control device, a cloning operation at least in part by:
identifying a most recently updated one of a plurality of backup database instances as a first backup database instance;
identifying another of the plurality of backup database instances that was updated most recently after the first backup database instance as a second backup database instance;
upon a first condition that a time difference between an update time of the first backup database instance and an update time of the second backup database instance is less than a defined value, selecting, as a source instance for cloning, one of the first backup database instance or the second backup database instance satisfying at least one of a geographical proximity criterion or a logical proximity criterion with respect to a designated database instance, wherein the logical proximity criterion is based on whether the first backup database instance or the second backup database instance is hosted by a particular computerized server of the computerized servers that also hosts the designated database instance; and
cloning the source instance to the designated database instance, wherein cloning the source instance to the designated database instance comprises copying data associated with the source instance from one or more of the computerized servers that store the data associated with the source instance to the particular computerized server that hosts the designated database instance.

15. The method of claim 14, comprising:
before cloning the source instance to the designated database instance, performing at least one of:
verifying that the first backup database instance or the second backup database instance selected as the source instance exists;
validating the designated database instance and the first backup database instance or the second backup database instance selected as the source instance in a configuration management database; and
verifying that the first backup database instance or the second backup database instance selected as the source instance is capable of being successfully restored.

16. The method of claim 14, comprising:
before cloning the source instance to the designated database instance, provisioning the designated database instance by appropriating storage hardware to ready the designated database instance for access by a client.

17. The method of claim 14, comprising:
receiving a roll back instruction within a defined time period after cloning the source instance to the designated database instance;
repointing an application node from a target database associated with the particular computerized server to a previously-created backup database of the designated database instance; and
retiring the previously-created backup database when the defined time period has passed.

18. The method of claim 14, wherein the control device is configured to couple to the one or more computerized servers through a network, wherein the one or more computerized servers comprise at least a first computerized server including a primary database and a second computerized server including a secondary database, and wherein at least one of the one or more computerized servers is configured to store backup database instances respectively constructed by copying data from one of the primary database or the secondary database.

19. The method of claim 18, comprising:
upon a second condition that an age of the first backup database instance selected as the source instance or an age of the second backup database instance selected as the source instance is greater than a defined age, selecting, as the source instance for cloning, one of the primary database or the secondary database.

* * * * *